Dec. 16, 1924.
J. OGREN
TRUCK BODY
Filed Dec. 7, 1922
1,519,416
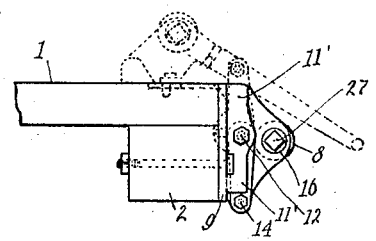
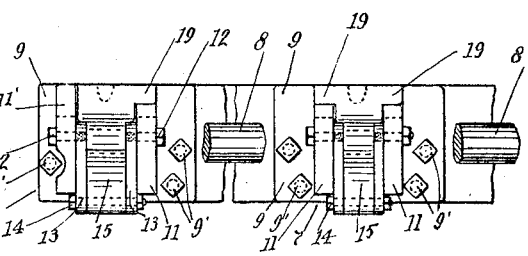
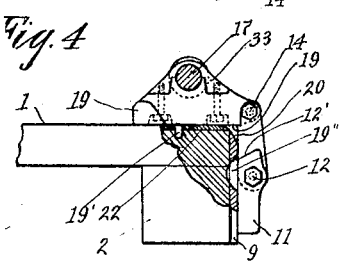
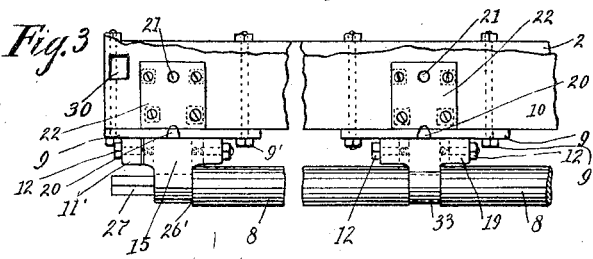
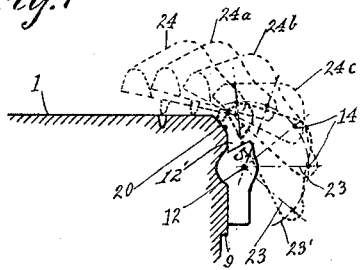
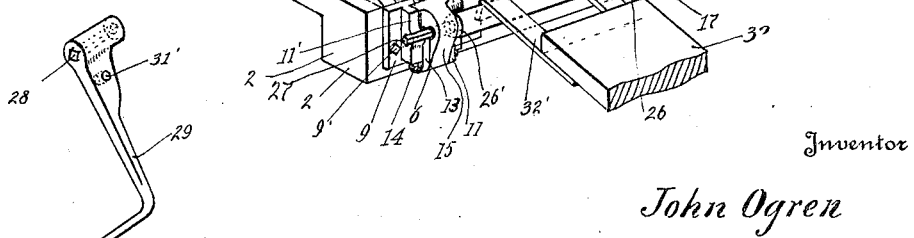
Inventor
John Ogren
By H. S. Johnson
Attorney Patented Dec. 16, 1924.

1,519,416

UNITED STATES PATENT OFFICE.

JOHN OGREN, OF STILLWATER, MINNESOTA.

TRUCK BODY.

Application filed December 7, 1922. Serial No. 605,377.

*To all whom it may concern:*

Be it known that I, JOHN OGREN, a citizen of the United States, residing at Stillwater, in the county of Washington and State of Minnesota, have invented certain new and useful Improvements in Truck Bodies, of which the following is a specification.

This invention relates to lumber trucks, and more particularly to trucks designed for mechanically unloading a pile of lumber as a unit, the principal object of the invention being the provision of built-in means carried by the truck body, whereby the floor thereof may be easily and readily rendered available for transporting such manufactured mill-work and other merchandise as requires careful handling during transportation, and which cannot be safely hauled unless resting upon a flat, smooth bottom, free from indents and shoulders.

A further object of the invention is the provision of roller mechanism, which includes main manually operated roller devices having intermediate journal support, thereby enabling the structure to be materially reduced in weight and size, so that it may be readily lifted by one person to be swung clear of the top surface of the truck bed, novel means being provided for effectively holding the roller in inoperative position.

A further object of the invention is the provision of a manually operable load propelling roller for lumber trucks, which is located in its entirety on the rear end of the truck body or bed, approximately within the top and bottom body lines of the latter, which lines define the maximum thickness of the rear end thereof, as distinguished from the structure shown in the application for Letters Patent filed by me February 16th, 1922, Serial Number 536,929, Patent Number 1,439,257, wherein the main load propelling roller is swingable from operative position to be suspended from the under side of the truck bed at a point immediately adjacent the rear end thereof.

I have found it desirable to have the under side of the truck bed, for an appreciable distance from the rear end thereof, entirely clear of obstruction, for the reason that it frequently occurs that the rear end of the body of the truck in backing toward a platform preparatory to being loaded, overlaps or extends over the edge of the platform, with but a slight clearance between them, thus frequently damaging any mechanism (such as is illustrated in the patent referred to), which is suspended from the under side of the truck body.

A still further object of the invention is the provision of a swingable roller for propelling the load, which, when swung to inoperative position, will function as a substitute for the customary rail extending across the rear end of the truck body, to receive the hooks customarily secured to the end of a plank which is ordinarily used as a slide for unloading heavy objects such as boxes and barrels, the rollers also serving effectively as buffers for the rear end of the truck body.

Other objects and advantages of the invention will be pointed out as this specification progresses, the invention consisting in the construction, combination, and arrangement of parts hereinafter described and claimed.

In the drawings forming part of this specification:

Figure 1, is a fragmentary perspective view of the rear end of a truck body equipped with my invention.

Figure 2, is a fragmentary rear view of the truck body showing the invention applied thereto.

Figure 3, is a top view of same.

Figure 4, is a side view showing the center journal support, part of the truck body being broken away.

Figure 5, is a side view showing the end journal support.

Figure 6, is a perspective view of the handle for turning the roller; and

Figure 7, is a diagram indicating the progressive positions assumed by the roller in its swinging movement from operative to inoperative position.

In the drawings, 1 designates the floor or top surface of the truck bed, 2 a bolster extending across the rear end thereof, 3 a secondary roller lying loosely on the floor and extending transversely thereof, and 4 a pair of pins, extending slightly above the floor, one on either side of said roller, said pins being loosely inserted in the openings 5, so that they may be removed when desired to render the floor unobstructed.

My invention comprises end journal supports 6, and preferably one central journal support 7, said supports supporting for rotation the roller 8. The central support 7 comprises a base 9, which base is formed with a flat plate adapted to be secured as by means of the bolts 9' to the rear end wall 10 of the truck body, and a pair of laterally spaced elongated lugs 11 extending vertically short of the top edge of the plate, the space between the lugs being of uniform width and the lugs forming parallel side walls. Intermediate its ends, each of the lugs has a horizontally disposed pivot bolt 12 extending inwardly beyond the inner wall of the lug and in parallelism with the end wall 10 of the truck and being in lateral alinement with the pin of the adjacent lug. The upper end of each lug is preferably formed with a rearwardly inclined edge 12' to form an upwardly facing notch or recess between the lug and the plate.

Pivotally mounted on the pivot bolts 12 are the depending links 13, one for each lug, said links having at their lower extremities respectively, pivotal connection 14 with the journal block 15, the axis of rotation of said pivotal connection being parallel with that of the pivots 12. The journal block extends from the pivot 14 to a point flush with, or a trifle below, the floor 1 and the upper edge of the base 9, and is formed intermediate its ends with a journal opening 16 disposed in parallelism with the pivots 12 and 14 and adapted to receive for rotation the central bearing 17 of the roller 8. The journal block is further formed with opposite shoulders 18 which loosely fit between the lugs 11 and with laterally extending, oppositely disposed projections 19, said projections being formed to fit respectively the recesses formed by the inclined edge 12', whereby the journal block is yieldingly held against an outward swinging movement about the pivot 14.

The lower portion of the journal box is preferably of uniform width, as are also the links 13, the journal block and links collectively loosely fitting the space between the lugs 11, to be easily withdrawn therefrom, so that the lower portion of the journal block, together with the links, may be freely swung outwardly about the pivot 12. When the journal block is in its locked position, as is best shown in Figure 5, the inner face 19 thereof will rest flatly against the plate of the base, so that when the truck is accidentally backed against an object, the force will be distributed endwise directly to the truck body, the blocks thus effectively functioning as buffers to protect the rear end of the truck body. Projecting at right angles from the face 19 of the journal block is the steady pin 19', said pin being so positioned as to enter the cavity 19'' of the base when the journal block is in locked, out-of-use position. The base is further cut away at its upper edge, as at 20, for a purpose to be hereinafter described.

The floor 1 is provided with openings 21, one for each of the journal supports, said openings being located to receive the pin 19' when the journal box is swung upwardly about the pivot 14 and brought to rest with its under face on the floor of the truck body. Thus, the pins prevent displacement of the journal boxes by shifting merchandise carried by the truck. To prevent abrasion of the truck body, I preferably provide metallic plates 22 to receive the openings 21, these plates being sunk flush with the top of the floor as shown in Figures 3 and 4 of the drawings.

Referring now to diagram 7, the line 23 designates the axes of the links 13 and intersects the pivots 12 and 14, while the arc 23' indicates the path traversed by the pivot 14 during a swinging movement of the journal block from locked, out-of-use position to operative position on the floor of the truck. The journal block is indicated by a dotted outline, and its progressive movement may be traced from the outline 24, which shows the block having been manually lifted out of engagement with the openings 21, to the block 24ª, wherein the pin 19' is shown sliding on the floor of the truck, to 24ᵇ, wherein the pin is shown sliding over the cut away portion 20, to 24ᶜ, wherein the projection 19 is shown entering the recess 12' to final inoperative position indicated in Figure 5, wherein the journal block is in locked, out-of-use position and the pin thereof is projected into the cavity 19'', the bottom of the block now resting against the plate of the base 9.

The roller 8 is formed with suitable end journal bearings 25 and shoulders 26 between which shoulders it is formed of increased diameter to project beyond the outermost extremity of the journal block, as indicated at 26'. Extending outwardly from the bearings 25, the roller is also provided with a squared stub 27, adapted to loosely fit the socket 28 of the crank lever 29, whereby the roller may be manually rotated when in operative position to roll the load of lumber off the truck.

The end supports 6 are identical in construction with the central support 7, excepting that the outer lug 11' thereof extends preferably to the extreme top edge of the plate of the base, the journal block being accordingly provided with but one lug 19, as is best shown in Figures 2 and 3, for the purpose of affording clearance between the outer longitudinal edge of the truck body and the side of the journal block, to permit the insertion of a stave in the opening 30, shown in Figure 3, it being customary to have a stave at or adjacent to the rear end of the truck. For the purpose of holding the roller against rotation during transportation of a load of lumber, I provide a pin 31, one at each rear corner of the truck bed (one only being shown), which pin is adapted to loosely enter the opening 31' in the shank of the handle 29. Thus, the handle may be applied to the stub 27 in reverse position, so that the hand engaging end thereof will extend inwardly and thus permit the shank 29 to rest upon the base 9, as indicated by dotted lines in Figure 5, whereby the roller is held against rotation. As there is considerable clearance between the roller and the outer face of the plate of the base, the roller, when in its normal out-of-use position, functions as a support for an ordinary wagon gang plank 32, of the type indicated in Figure 1. These planks are customarily provided with hooks 32' adapted to hook over a transverse rod ordinarily provided at the rear of the trucks. This feature is a great advantage and convenience, inasmuch as the rollers form a substantial support and are located at a convenient level to render the use of these loading planks convenient. In operation one or more of the rollers 3 may be provided. The roller 8 is now manually swung about the pivot 14 through an arc represented by the line 23', the pins 19' being brought to bear against the cut away or beveled portions 20 and then allowed to ride thereover until they slide into the openings 21, when the roller will be in operative position.

By having a central bearing 17, I am enabled to use a roller of small diameter, inasmuch as the span between the bearings is much reduced. In order to insert the bearing 17 in the central journal block, the latter is formed with a removable cap 33, the outer contour of said block being similar, however, to the end blocks. By constructing the device as described, I secure a compact and light weight structure, which is normally located in its entirety between the top and under side of the truck body, so that there are no projections to interfere with backing the rear end of the truck bed over a platform. Further, by the construction enabling the roller and its supports to ride as by the pin 19' over the floor of the truck, the attendant is required only to initially lift the pins out of engagement with the openings 19', whereafter he need only drag the device into inoperative position, thus relieving the attendant from the tedious labor of bodily lifting the entire device from operative to inoperative position, as is the case in the patent mentioned in the foregoing.

I claim:

1. A truck body having a roller mounting pivotally connected thereto, said mounting having an operative position above the level of the floor of said truck body, and an inoperative position laterally adjacent, but below the level of said floor, a roller rotatably connected to the roller mounting, and means to rotate the roller, when the mounting is in an operative position to cause a relatively rearward movement of lumber carried by said truck body and resting on said roller.

2. In a truck body having a rear end wall, the combination with the floor thereof, of means including a conveyor roller constructed to be manually actuated to roll the load, supports having projections rotatably supporting said roller and resting loosely on the rear end of the floor, openings in the floor, means carried by said supports adapted to engage said openings for holding the supports against shifting on the floor, pivot supports having recesses adapted to receive said projections located below the level of the floor and supported on the rear end wall of the truck body, and pivotal link connections between said pivot supports and roller supports constructed to render the latter movable to bring their projections respectively into engagement with the recesses of said pivot supports to thereby suspend the former on the latter.

3. In a roller truck body having a rear end wall, the combination with the floor thereof, of roller supports resting loosely on the floor at the rear end thereof and having readily detachable connection with the floor to prevent lateral shifting thereon, said detachable connection being constructed to become detached responsive to a vertical bodily movement of said supports, a roller journaled in said supports, means for manually rotating the roller, and a plurality of hinge connections between said end wall and roller supports, said hinge connections including a support for said roller supports, and being constructed and proportioned to permit said roller supports to be initially manually detached from the floor and then be dragged on the latter and over a part of said end wall to be brought to rest thereagainst and be supported thereat.

4. In a roller truck body having a rear end wall, the combination with the floor thereof, of roller supports resting loosely on the floor at the rear end thereof and having readily detachable connection with the floor to prevent lateral shifting thereon, said detachable connection being constructed to become detached responsive to a vertical bodily movement of said supports, a roller journaled in said supports, means for manually rotating the roller, and a plurality of hinge connections between said end wall and roller supports to permit the latter to be initially detached from the floor and be swung to a position located below the level of the latter, said hinge connections including a base secured to said end wall, and having upwardly facing recesses, and means carried by the roller supports for engaging respectively said recesses to be supported thereby.

5. In a roller truck body having a rear end wall, the combination with the floor thereof, of roller supports resting loosely on the floor at the rear end thereof and having readily detachable connection with the floor to prevent lateral shifting thereon, said detachable connection being constructed to become detached responsive to a vertical bodily movement of said supports, a plurality of hinged connections between said end wall and roller supports, said hinge connections including a support for said roller supports and being constructed and proportioned to permit said roller supports to be initially manually detached from the floor and swung to a position located below the level of the latter and be brought to rest against said rear wall and be supported thereat, and a roller journaled in said supports and having means for being manually rotated and being mounted in a manner in said roller supports to be spaced sufficiently from said rear end wall to permit the hooks of a loading plank to be inserted therebetween.

6. In a conveyor roller for truck bodies of the class described, in combination, laterally alined journal supports resting on the rear end of the truck floor, a roller journaled in said supports, hinge connections between said journal supports and the truck body, whereby said roller is rendered swingable to clear the floor, and supporting means for said journal supports to support the latter when in outswung position, said means being constructed and so located on the truck body as to support said journal supports and the roller journaled therein in their entirety within those body lines of the truck body which define the thickness of an appreciable portion of the rear end thereof, for the purpose set forth.

7. In a conveyor roller for truck bodies of the class described, in combination, laterally alined journal supports resting on the rear end of the truck floor, a roller journaled in said supports, hinge connections between said journal supports and the truck body, whereby said roller is rendered swingable to clear the floor, and supporting means for said journal supports to support the latter when in outswung position, secured to the rear end of the truck body, said supporting means including for each journal support a flat bottomed base secured with its bottom directly to the rear end of the truck body and being formed with a seat upon which is adapted to be directly seated the respective journal support, whereby to effect a nonyielding structure to function as a buffer element.

In testimony whereof I affix my signature.

JOHN OGREN.